US011901145B2

(12) United States Patent
Adkins et al.

(10) Patent No.: US 11,901,145 B2
(45) Date of Patent: Feb. 13, 2024

(54) SYSTEMS AND METHODS FOR DETECTING WELDED CONTACTS IN AN ELECTROMAGNETIC SWITCH SYSTEM

(71) Applicant: Rockwell Automation Technologies, Inc., Mayfield Heights, OH (US)

(72) Inventors: Kyle B. Adkins, Oak Creek, WI (US); Andrew E. Carlson, Franklin, WI (US); David M. Messersmith, Kenosha, WI (US); David Elmiger, Hitzkirch (CH)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 313 days.

(21) Appl. No.: 17/485,734

(22) Filed: Sep. 27, 2021

(65) Prior Publication Data

US 2023/0101428 A1 Mar. 30, 2023

(51) Int. Cl.

| | |
|---|---|
| ***H02P 1/10*** | (2006.01) |
| ***H01H 47/00*** | (2006.01) |
| ***H01H 50/18*** | (2006.01) |
| ***H01H 50/44*** | (2006.01) |

(52) U.S. Cl.

CPC .......... *H01H 47/002* (2013.01); *H01H 50/18* (2013.01); *H01H 50/44* (2013.01)

(58) Field of Classification Search

CPC ...... H01H 47/002; H01H 50/18; H01H 50/44; H01H 2047/003

See application file for complete search history.

(56) References Cited

U.S. PATENT DOCUMENTS

| | | | |
|---|---|---|---|
| 5,774,323 A | 6/1998 | Innes et al. | |
| 6,023,110 A | 2/2000 | Henrion et al. | |
| 6,233,132 B1 | 5/2001 | Jenski | |
| 7,417,519 B2 * | 8/2008 | Miller .................. | H01H 47/004 335/185 |

FOREIGN PATENT DOCUMENTS

| | | |
|---|---|---|
| EP | 2892071 A1 | 7/2015 |
| EP | 3113203 A1 | 1/2017 |

OTHER PUBLICATIONS

Extended European Search Report for Application No. 22198007.1 dated Jan. 27, 2023, 7 pages.

* cited by examiner

*Primary Examiner* — Muhammad S Islam

(74) *Attorney, Agent, or Firm* — Fletcher Yoder, P.C.

(57) ABSTRACT

A non-transitory, computer-readable medium may include instructions executable by at least one processor in a computing device to cause the processor to perform operations that include transmitting, to a first power source, a command to provide power to a coil of a switching device with a fixed current profile. The operations also include receiving one or more voltage measurements associated with the coil during a period of time, determining whether the voltage measurements associated with the coil indicate that one or more movable contacts of the switching device are at least partially welded to one or more contacts of an electric circuit, and transmitting an additional command to a second power source to disconnect a current to the coil in response to determining that the voltage measurements indicate that the movable contacts of the switching device are at least partially welded to the contacts of the electric circuit.

20 Claims, 5 Drawing Sheets

SYSTEMS AND METHODS FOR DETECTING WELDED CONTACTS IN AN ELECTROMAGNETIC SWITCH SYSTEM

BACKGROUND

This section is intended to introduce the reader to various aspects of art that may be related to various aspects of the present disclosure, which are described or claimed below. This discussion is believed to be helpful in providing the reader with background information to facilitate a better understanding of the various aspects of the present disclosure. Accordingly, it should be understood that these statements are to be read in this light, and not as admissions of prior art.

The present disclosure relates generally to switching devices, and more particularly to sensing properties associated with the switching devices and operation of the switching devices. Switching devices are generally used throughout industrial, commercial, material handling, process and manufacturing settings, to mention only a few. As used herein, “switching device” is generally intended to describe any type of electromechanical switching device, such as mechanical switching devices (e.g., a contactor, a relay, air break devices, and controlled atmosphere devices) or solid-state devices (e.g., a silicon-controlled rectifier (SCR)). More specifically, switching devices generally open to disconnect electric power from a load and close to connect electric power to the load. For example, switching devices may connect and disconnect three-phase electric power to an electric motor. Over time, these switching devices may begin to wear and operate less effectively. As such, it may be desirable to monitor the wear and state of the switching devices over time to ensure proper operations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system may include a first power source and a switching device. The switching device may include an armature that may electrically couple one or more movable contacts to one or more contacts of an electric circuit. The switching device may also include a coil that may receive a current from a second power source, thereby causing the armature to electrically couple the movable contacts to the contacts of the electric circuit or electrically disconnect the movable contacts form the contacts after a period of time. Furthermore, the system may include a control system. The control system may perform operations that include transmitting a command to the second power source to provide power to the coil, receiving one or more voltage measurements associated with the coil during the period of time, determining that the voltage measurements indicate that the movable contacts are at least partially welded to the contacts of the electric circuit, and in response to determining that the voltage measurements indicate that the movable contacts are at least partially welded to the one or more contacts of the electric circuit, transmitting an additional command to the second power source to disconnect the current to the coil.

In another embodiment, a method may include transmitting, by a control system to a first power source associated with a switching device, a command to provide power to a coil of the switching device with a fixed current profile, and receiving, by the control system, one or more voltage measurements associated with the coil during a period of time. The method may also include determining, by the control system, that the voltage measurements indicate that one or more movable contacts of the switching device are at least partially welded to one or more contacts of an electric circuit, and in response to determining that the one or more voltage measurements indicate that the movable contacts of the switching device are at least partially welded to the contacts of the electric circuit, transmitting, by the control system, an additional command to a second power source to disconnect a current to the coil.

In another embodiment, a non-transitory, computer-readable medium may include instructions executable by at least one processor in a computing device to cause the processor to perform operations that include transmitting, to a first power source associated with a switching device, a command to provide power to a coil of the switching device with a fixed current profile. The operations also include receiving one or more voltage measurements associated with the coil during a period of time, determining whether the voltage measurements associated with the coil indicate that one or more movable contacts of the switching device are at least partially welded to one or more contacts of an electric circuit, and transmitting an additional command to a second power source to disconnect a current to the coil in response to determining that the voltage measurements indicate that the movable contacts of the switching device are at least partially welded to the contacts of the electric circuit.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
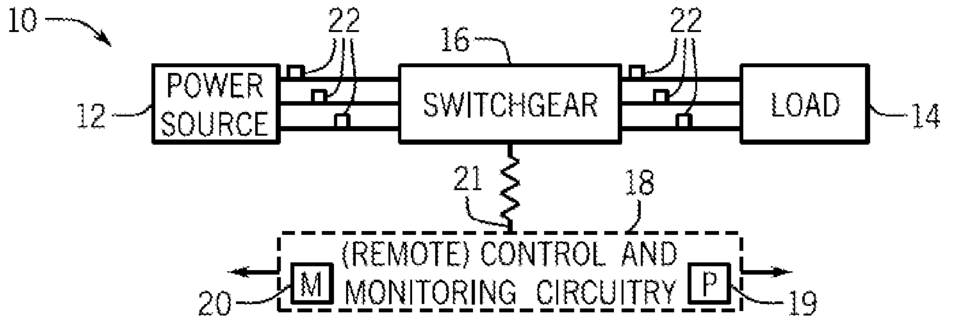
FIG. 1 is a diagrammatical representation of a set of switching devices to provide power to an electrical load, in accordance with an embodiment described herein.

One or more specific embodiments will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

As described above, switching devices are used in various implementations—such as industrial, commercial, material handling, manufacturing, power conversion, or power distribution—to connect or disconnect electric power from a load. For example, a number of switching devices may be used to control operations, monitor conditions, and perform other operations related to various equipment in an industrial automation system. As such, the switching devices may be used to coordinate operations across a number of devices.

In some cases, after contacts of a switching device close to provide power to an electric motor, the contacts of the switching device may weld or partially weld together due to an excessive quantity of start-up current applied when providing power to the electric motor or from bouncing of the contacts of the switching device as the contacts close, or both. Switching devices with contacts that are welded together or partially welded together may pose various electrical and mechanical issues. For example, such switching devices may prevent power from being disconnected from electric motors. As such, it may be desirable to detect welded or partially welded contacts of switching contacts before closing the switching devices to connect electric power to an electric motor.

Keeping this in mind, a switching device may include a relay device that has an armature that may couple a common contact of the relay device to a corresponding contact of an electric circuit. For example, the armature may electrically couple the common contact of the relay device to the corresponding contact of the electric circuit depending on a state of the relay device.

In certain embodiments, the switching device include a Form A contact structure, a Form B contact structure, a Form C contact structure, a single-pole, single-throw double-break contact structure, or the like. For example, in a Form C switching device, the armature is positioned such that the common contact and a first contact of the electric circuit are electrically coupled to each other (i.e., the switching device is open) when a relay coil of the relay device is not energized or does not receive voltage or current from a driving circuit. However, when the relay coil of the relay device receives voltage or current from a driving circuit, the relay coil magnetizes and attracts the armature to the relay coil, thereby connecting the common contact to the second contact of the electric circuit (i.e., the switching device is closed). In this way, an open switching device may disconnect electric power from a load, and a closed switching device may connect electric power to the load.

The electrical connections between the common contact and the first contact and the second contact of the electric circuit are made via one or more respective intermediate contacts. Over time, the intermediate contacts that are used to make and break the electrical connections between the common contact and the second contact may become susceptible to being welded together. When the intermediary contacts become welded together or at least partially welded together, the switching device may become fixed in a closed state, such that the common contact of the armature remains electrically coupled to the second contact to provide electric power to the load. Because the intermediary contacts are welded together, the switching device may be prevented from opening, thereby maintaining the connection of electric power to the load. This, in turn, may cause electrical and mechanical safety issues, such as the inability to disable electric power to the load.

With the foregoing in mind, embodiments of the present disclosure are directed to determining whether a contact of a relay device (e.g., having a Form A contact structure, a Form B contact structure, a Form C contact structure, a SPST contact structure, or other suitable contact structure) is at least partially welded to a corresponding contact of an electric circuit before energizing the relay device to connect electric power to a load. As described herein, "an at least partially welded contact," "a partially welded contact," or "a welded contact" may refer to a contact of the relay device at least partially sticking to a corresponding contact of the electric circuit. The contact of the relay device and the corresponding contact of the electric circuit may stick together, such that an armature of the relay device may be prevented from retracting to a position to disconnect electric power from a load. To determine whether the contact of the relay device is at least partially welded to the corresponding contact of the electric circuit, the relay coil of the relay device may be supplied (e.g., pinged) with a non-intrusive voltage pulse or a non-intrusive current pulse to detect whether the contact of the relay device is at least partially welded to the corresponding contact of the electric circuit. That is, an at least partially welded contact of the relay device may be detected without powering the relay coil to connect electric power to the load and without relying on respective sensors on respective contacts of the relay device to detect such at least partially welded contacts. For instance, the inductance of the relay coil will be different if a contact of the relay device is at least partially welded to a contact of the electric circuit than the inductance of the relay coil without an at least partially welded contact.

To indirectly measure the inductance of the relay coil, the relay coil may be driven with either a fixed current profile or a fixed voltage profile. For example, a fixed current profile may be used to drive the relay coil and the resulting coil voltage may be measured over time. If a contact of the relay device is at least partially welded to a contact of the electric circuit, a deviation in relay coil inductance may exhibit in the voltage measurements of the relay coil used to maintain the fixed current profile driving the relay coil. That is, the voltage response (e.g., values of one or more voltage measurements) exhibited by the relay coil over time may correspond to a relay device having an at least partially welded contact. In this way, a partially welded contact of the relay device or a welded contact of the relay device may be detected without powering on the relay coil to connect electric power to the load and without relying on respective sensors on the contacts of the relay device to detect such partially welded or welded contacts. Additional details with regard to detecting welded switching devices will be described below with reference to FIGS. 1-7.

By way of introduction, FIG. 1 depicts a system 10 that includes a power source 12, a load 14, and switchgear 16, which includes one or more switching devices that may be controlled using the techniques described herein. In the depicted embodiment, the switchgear 16 may selectively connect or disconnect three-phase electric power output by the power source 12 to the load 14, which may be an electric motor or any other powered device. In this manner, electrical power flows from the power source 12 to the load 14. For example, switching devices in the switchgear 16 may close to connect electric power to the load 14. On the other hand, the switching devices in the switchgear 16 may open to disconnect electric power from the load 14. In some embodiments, the power source 12 may be an electrical grid.

It should be noted that the three-phase implementation described herein is not intended to be limiting. More specifically, certain aspects of the disclosed techniques may be employed on single-phase circuitry or for applications other than power an electric motor. Additionally, it should be noted that in some embodiments, energy may flow from the power source 12 to the load 14. In other embodiments, energy may flow from the load 14 to the power source 12 (e.g., a wind turbine or another generator). More specifically, in some embodiments, energy flow from the load 14 to the power source 12 may transiently occur, for example, when overhauling a motor.

In some embodiments, operation of the switchgear 16 (e.g., opening or closing of switching devices) may be controlled by control and monitoring circuitry 18. More specifically, the control and monitoring circuitry 18 may instruct the switchgear 16 to connect or disconnect electric power. Accordingly, the control and monitoring circuitry 18 may include one or more processors 19 and memory 20. More specifically, as will be described in more detail below, the memory 20 may be a tangible, non-transitory, computer-readable medium that stores instructions, which when executed by the one or more processors 19 perform various processes described. It should be noted that non-transitory merely indicates that the media is tangible and not a signal. Many different algorithms and control strategies may be stored in the memory and implemented by the processor 19, and these will typically depend upon the nature of the load, the anticipated mechanical and electrical behavior of the load, the particular implementation, behavior of the switching devices, and so forth.

Additionally, as depicted, the control and monitoring circuitry 18 may be remote from the switchgear 16. In other words, the control and monitoring circuitry 18 may be communicatively coupled to the switchgear 16 via a network 21. In some embodiments, the network 21 may utilize various communication protocols such as DeviceNet, Profibus, Modbus, and Ethernet, to only mention a few. For example, to transmit signals between the control and monitoring circuitry 18 may utilize the network 21 to send, make, or break instructions to the switchgear 16. The network 21 may also communicatively couple the control and monitoring circuitry 18 to other parts of the system 10, such as other control circuitry or a human-machine-interface (not separately depicted). Additionally, the control and monitoring circuitry 18 may be included in the switchgear 16 or directly coupled to the switchgear, for example, via a serial cable.

Furthermore, as depicted, the electric power input to the switchgear 16 and output from the switchgear 16 may be monitored by sensors 22. More specifically, the sensors 22 may monitor (e.g., measure) the characteristics (e.g., voltage or current) of the electric power. Accordingly, the sensors 22 may include voltage sensors and current sensors. These sensors may alternatively be modeled or calculated values determined based on other measurements (e.g., virtual sensors). Many other sensors and input devices may be used, depending upon the parameters available and the application. Additionally, the characteristics of the electric power measured by the sensors 22 may be communicated to the control and monitoring circuitry 18 and used as the basis for algorithmic computation and generation of waveforms (e.g., voltage waveforms or current waveforms) that depict the electric power. More specifically, the waveforms generated based on input from the sensors 22 monitoring the electric power input into the switchgear 16 may be used to define the control of the switching devices, for example, by turning off the power source 12 when the switching devices are detected to be welded together. The waveforms generated based on the sensors 22 monitoring the electric power output from the switchgear 16 and supplied to the load 14 may be used in a feedback loop to, for example, monitor conditions of the load 14.

Figure 2:
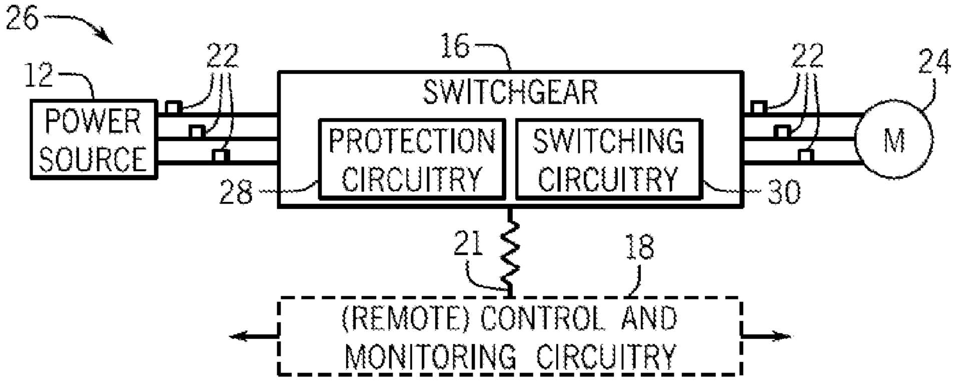
FIG. 2 is a similar diagrammatical representation of a set of switching devices to provide power to an electrical motor, in accordance with an embodiment described herein.

As described above, the switchgear 16 may connect and/or disconnect electric power from various types of loads 14, such as an electric motor 24 included in the motor system 26 depicted in FIG. 2. As depicted, the switchgear 16 may connect and/or disconnect the power source 12 from the electric motor 24, such as during startup and shut down. Additionally, as depicted, the switchgear 16 will typically include or function with protection circuitry 28 and the actual switching circuitry 30 that makes and breaks connections between the power source and the motor windings. More specifically, the protection circuitry 28 may include fuses and/or circuit breakers, and the switching circuitry 30 will typically include relays, contactors, and/or solid-state switches (e.g., SCRs, MOSFETs, IGBTs, or GTOs), such as within specific types of assembled equipment (e.g., motor starters).

More specifically, the switching devices included in the protection circuitry 28 may disconnect the power source 12 from the electric motor 24 when a weld, an overload, a short circuit condition, or any other unwanted condition is detected. Such control may be based on the un-instructed operation of the device (e.g., due to heating, detection of excessive current, and/or internal fault), or the control and monitoring circuitry 18 may instruct the switching devices (e.g., contactors or relays) included in the switching circuitry 30 to open or close. For example, the switching circuitry 30 may include one (e.g., a three-phase contactor) or more contactors (e.g., three or more single-pole, single current-carrying path switching devices).

Accordingly, to start the electric motor 24, the control and monitoring circuitry 18 may instruct the one or more contactors in the switching circuitry 30 to close individually, together, or in a sequential manner. On the other hand, to stop the electric motor 24, the control and monitoring circuitry 18 may instruct the one or more contactors in the switching circuitry 30 to open individually, together, or in a sequential manner. When the one or more contactors are closed, electric power from the power source 12 is connected to the electric motor 24 or adjusted and, when the one or more contactors are open, the electric power is removed from the electric motor 24 or adjusted. Other circuits in the system may provide controlled waveforms that regulate operation of the motor (e.g., motor drives, automation controllers, etc.), such as based upon movement of articles or manufacture, pressures, temperatures, and so forth. Such control may be based on varying the frequency of power waveforms to produce a controlled speed of the motor.

In some embodiments, the control and monitoring circuitry 18 may determine when to open or close the one or more contactors based at least in part on the characteristics of the electric power (e.g., voltage, current, or frequency) measured by the sensors 22. Additionally, the control and monitoring circuitry 18 may receive an instruction to open or close the one or more contactors in the switching circuitry 30 from another part of the motor system 26, for example, via the network 21.

Figure 3:
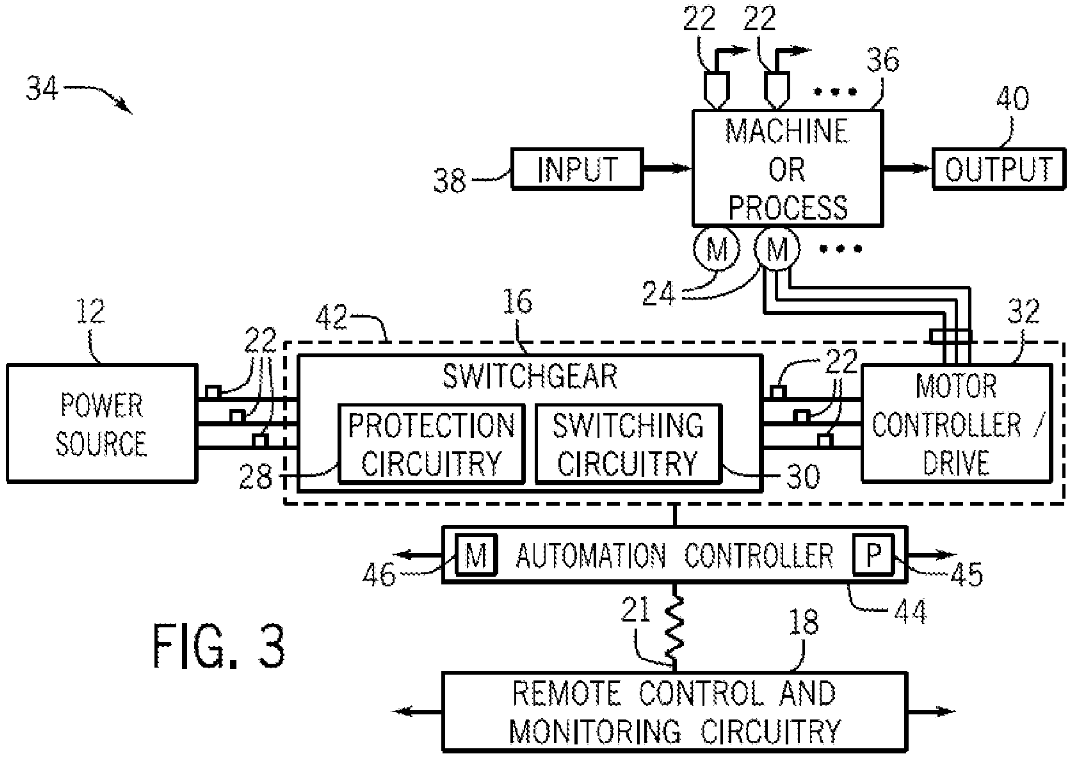
FIG. 3 is a similar diagrammatical representation of a set of switching devices to provide power to an electrical motor, in accordance with an embodiment described herein.

In addition to using the switchgear 16 to connect or disconnect electric power directly from the electric motor 24, the switchgear 16 may connect or disconnect electric power from a motor controller/drive 32 included in a machine or process system 34 as shown in FIG. 3. More specifically, the system 34 includes a machine or process 36 that receives an input 38 and produces an output 40 as depicted in FIG. 3.

To facilitate producing the output 40, the machine or process 36 may include various actuators (e.g., electric motors 24) and sensors 22. As depicted in FIG. 3, one of the electric motors 24 is controlled by the motor controller/drive 32. More specifically, the motor controller/drive 32 may control the velocity (e.g., linear and/or rotational), torque, and/or position of the electric motor 24. Accordingly, as used herein, the motor controller/drive 32 may include a motor starter (e.g., a wye-delta starter), a soft starter, a motor drive (e.g., a frequency converter), a motor controller, or any other desired motor powering device. Additionally, since the switchgear 16 may selectively connect or disconnect electric power from the motor controller/drive 32, the switchgear 16 may indirectly connect or disconnect electric power from the electric motor 24.

As used herein, the "switchgear/control circuitry" 42 is used to generally refer to the switchgear 16 and the motor controller/drive 32. As depicted, the switchgear/control circuitry 42 is communicatively coupled to a controller 44 (e.g., an automation controller. More specifically, the controller 44 may be a programmable logic controller (PLC) that locally (or remotely) controls operation of the switchgear/control circuitry 42. For example, the controller 44 may instruct the motor controller/driver 32 regarding a desired velocity of the electric motor 24. Additionally, the controller 44 may instruct the switchgear 16 to connect or disconnect electric power. Accordingly, the controller 44 may include one or more processors 45 and memory 46. More specifically, the memory 46 may be a tangible non-transitory computer-readable medium on which instructions are stored. As will be described in more detail below, the computer-readable instructions may be configured to perform various processes described when executed by the one or more processors 45. In some embodiments, the controller 44 may also be included within the switchgear/control circuitry 42.

Furthermore, the controller 44 may be coupled to other parts of the machine or process system 34 via the network 21. For example, as depicted, the controller 44 is coupled to the remote control and monitoring circuitry 18 via the network 21. More specifically, the automation controller 44 may receive instructions from the remote control and monitoring circuitry 18 regarding control of the switchgear/control circuitry 42. Additionally, the controller 44 may send measurements or diagnostic information, such as the status of the electric motor 24, to the remote control and monitoring circuitry 18. In other words, the remote control and monitoring circuitry 18 may enable a user to control and monitor the machine or process 36 from a remote location.

Moreover, sensors 22 may be included throughout the machine or process system 34. More specifically, as depicted, sensors 22 may monitor electric power supplied to the switchgear 16, electric power supplied to the motor controller/drive 32, and electric power supplied to the electric motor 24. Additionally, as depicted, sensors 22 may be included to monitor the machine or process 36. For example, in a manufacturing process, sensors 22 may be included to measure speeds, torques, flow rates, pressures, the presence of items and components, or any other parameters relevant to the controlled process or machine.

As described above, the sensors 22 may provide feedback information gathered regarding the switchgear/control circuitry 42, the motor 24, and/or the machine or process 36 to the control and monitoring circuitry 18 in a feedback loop. More specifically, the sensors 22 may provide the gathered information to the automation controller 44 and the automation controller 44 may relay the information to the remote control and monitoring circuitry 18. Additionally, the sensors 22 may provide the gathered information directly to the remote control and monitoring circuitry 18, for example via the network 21.

To facilitate operation of the machine or process 36, the electric motor 24 converts electric power to provide mechanical power. To help illustrate, an electric motor 24 may provide mechanical power to various devices. For example, the electric motor 24 may provide mechanical power to a fan, a conveyer belt, a pump, a chiller system, and various other types of loads that may benefit from the advances proposed.

As discussed in the above examples, the switchgear/control circuitry 42 may control operation of a load 14 (e.g., electric motor 24) by controlling electric power supplied to the load 14. For example, switching devices (e.g., contactors) in the switchgear/control circuitry 42 may be closed to supply electric power to the load 14 and opened to disconnect electric power from the load 14.

Figure 4:
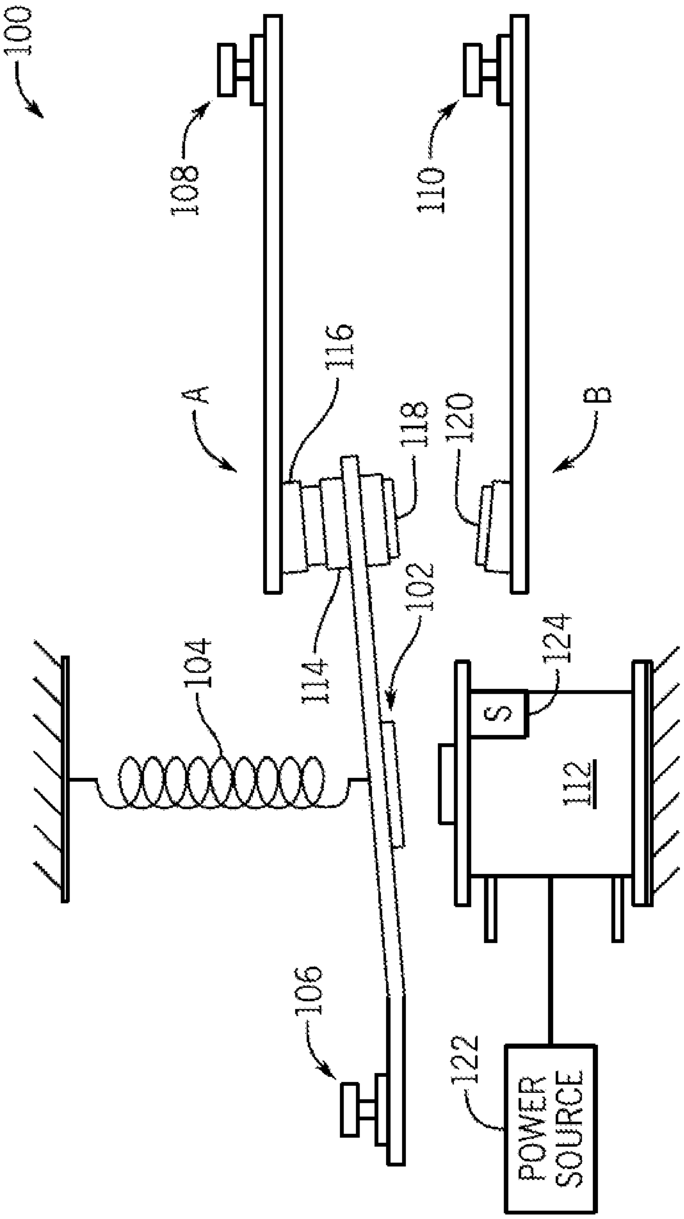
FIG. 4 is a system view of an example single-pole, single current-carrying path switching device, in accordance with an embodiment described herein.

By way of example, the switching device may include a relay device 100 that is composed of components illustrated in FIG. 4, some of which correspond to the components of the switching device described above. Although the relay device 100 shown in FIG. 4 is a Form C relay device 100, it should be understood that the techniques described herein that refer to the Form C relay device 100 are exemplary. In certain embodiments, the relay device may be a Form A relay device, a Form B relay device, a single-pole, single-throw double-break relay device, or any other suitable type of relay device in which an at least partially welded contact may be detected.

As shown in FIG. 4, the relay device 100 may include an armature 102 that is coupled to a spring 104. The armature 102 may have a common contact 106 that may be coupled to a part of an electrical circuit. The armature 102 may electrically couple the common contact 106 to a contact 108 or to a contact 110 depending on a state (e.g., energized) of the relay device 100. For example, when a relay coil 112 of the relay device 100 is not energized or does not receive voltage from a driving circuit, the armature 102 is positioned such that the common contact 106 and the contact 108 are electrically coupled to each other. When the relay coil 112 receives a driving voltage, the relay coil 112 magnetizes and attracts the armature 102 to itself, thereby connecting the contact 110 to the common contact 106.

The electrical connections between the common contact 106 and the contacts 108 and 110 are made via contacts 114 and 116 and contacts 118 and 120, respectively. Over time, as the contacts 114 and 116 and the contacts 118 and 120 strike against each other, the conductive material of the contacts 114, 116, 118, and 120 may begin to wear. Furthermore, as the contacts 114 and 116 and the contacts 118 and 120 strike against each other, the contacts may weld in a failed state. In this failed state, the armature 102 may be held in a mostly closed position.

Moreover, the relay coil 112 may include a core that maintains a core flux during the operation of the relay device 100. That is, as the armature 102 moves between connecting to the contact 108 and the contact 110, and vice-versa, a magnetic flux may be generated in a core of the relay coil 112 and/or the armature 102. This magnetic flux may be related to the core flux of the relay coil 112 and may change over time as the relay device operates.

The relay coil 112 may also one include or more sensors 124 that monitor (e.g., measure) the characteristics (e.g., voltage or current) of the relay coil 112 after pinging the relay coil 112 with a non-intrusive voltage pulse or a non-intrusive current pulse. Accordingly, the sensors 124 may include voltage sensors and/or current sensors. The characteristics of the relay coil measured by the sensors 124 may be communicated to the control and monitoring circuitry 18 and used as the basis for determining whether the contact 114, 118 of the relay device 100 is at least partially welded to a corresponding contact 116, 120 of the electrical circuit.

Figure 5:
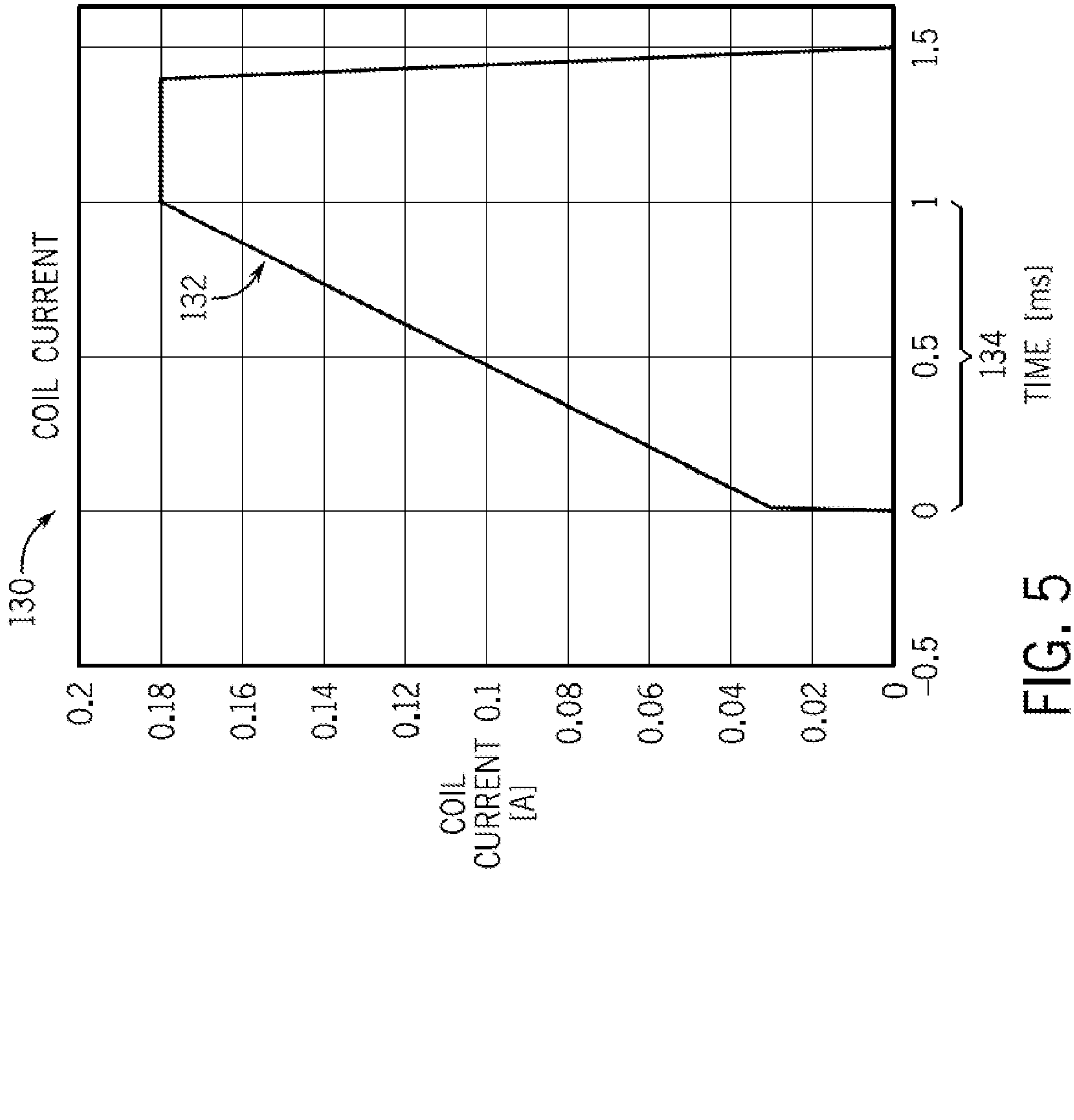
FIG. 5 is a current-time graph that depicts an exemplary current profile associated with a turn-on sequence of a respective switching device, in accordance with an embodiment herein.

As described above, the contacts 114 and 116 and the contacts 118 and 120 may weld together over time as the contacts 114 and 116 and/or the contacts 118 and 120 strike against each other, thereby maintaining the armature 102 in an open position or a closed position, respectively. Thus, it may be desirable to detect whether the contacts 114 and 116 or the contacts 118 and 120 are at least partially welded together before the armature 102 of the relay device 100 begins to move during a turn-on sequence of the relay device 100. For instance, FIG. 5 illustrates a current-time graph 130 that depicts an exemplary current profile 132 associated with a relay coil 112 during the turn-on sequence of a respective relay device 100. As shown in FIG. 5, the exemplary current profile 132 includes an application of a driving voltage to the relay coil 112 during a period of time 134 (i.e., from 0 milliseconds (ms) to approximately 1.5 ms). For example, the period of time 134 may correspond to the relay coil 112 receiving the driving voltage from the power source 12 and magnetizing, thereby attracting the armature 102 to the relay coil 112. During the period of time 134, the armature 102 may begin to move toward the relay coil 112 between 1 ms and 1.5 ms after the relay coil 112 receives the driving voltage. Thus, it may be beneficial to detect whether the contacts 118 and 120 are at least partially welded together before the armature 102 of the relay device 100 begins to move toward the relay coil 112 during the turn-on sequence of the relay device 100.

Figure 6:
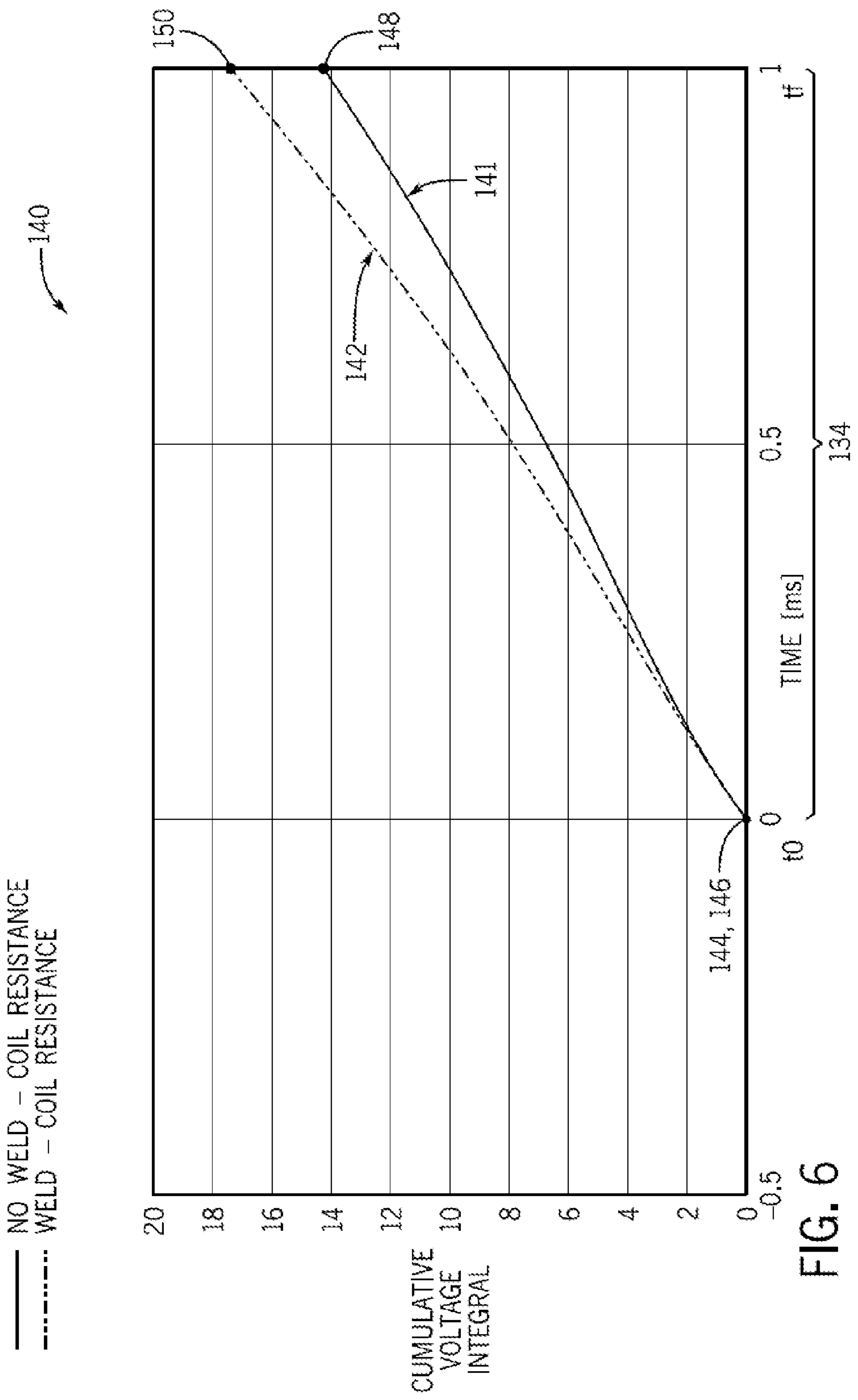
FIG. 6 is a cumulative voltage integral-time graph that depicts various coil voltage responses over time associated with respective switching devices having a non-welded contact or an at least partially welded contact that are driven using a fixed current profile, in accordance with an embodiment described herein.
Figure 7:
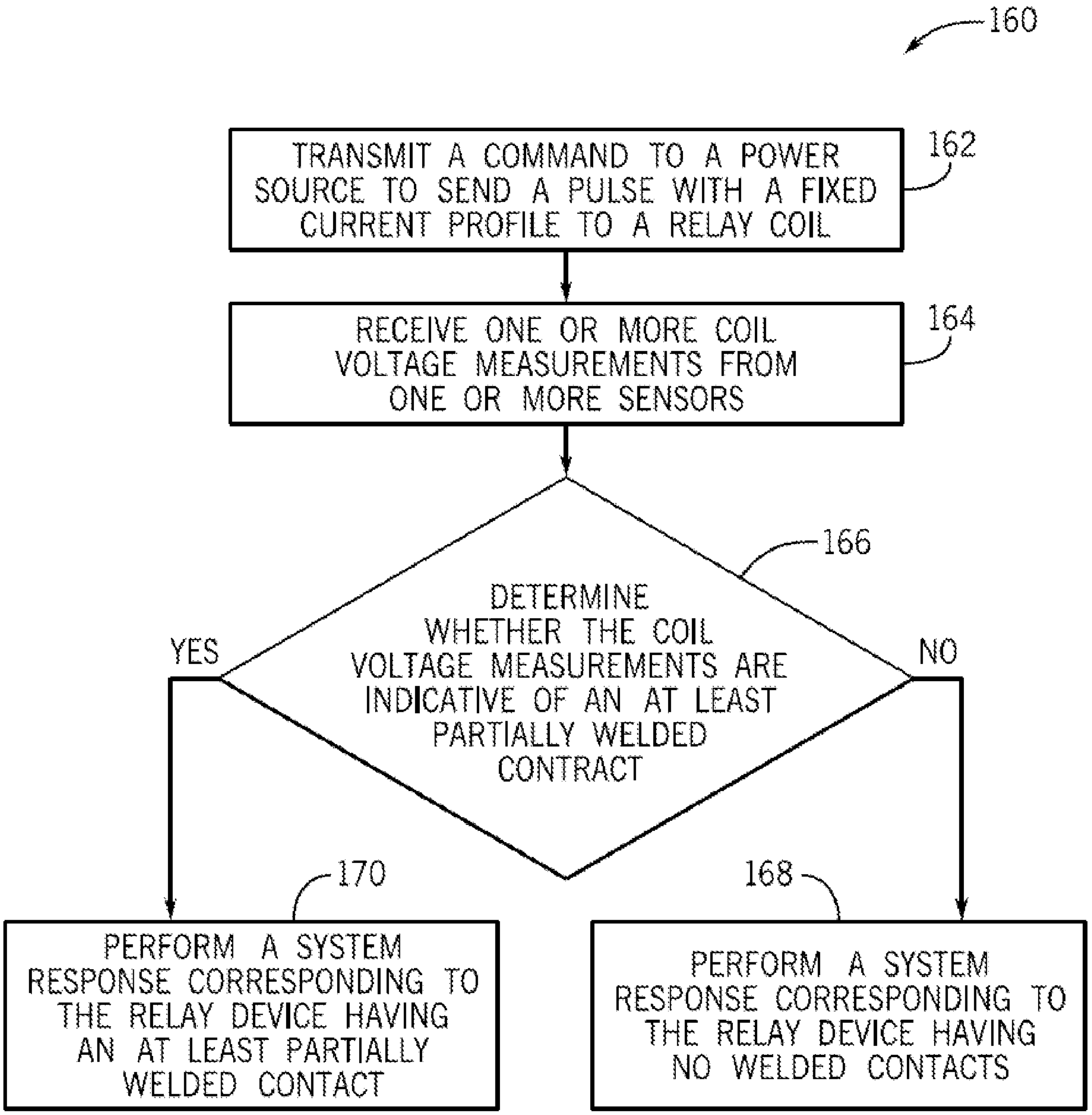
FIG. 7 is a flow chart of a method for determining whether a contact is at least partially welded based on the measured coil voltage of the switching device and performing a system response based upon the determination, in accordance with an embodiment described herein.

To determine whether the contacts 114 and 116 or the contacts 118 and 120 are at least partially welded together, the relay coil 112 of the relay device 100 may be pinged with a non-intrusive voltage pulse or a non-intrusive current pulse. For example, FIGS. 6 and 7 are described with reference to determining whether the contacts 118 and 120 are at least partially welded together. However, it should be understood that the techniques described herein may also be used to determine whether the contacts 114 and 116 are at least partially welded together.

FIG. 6 illustrates a cumulative voltage integral-time graph 140 that depicts various coil voltage responses 141 and 142 associated with respective relay devices (e.g., 100) that are driven using a fixed current profile during a period of time (e.g., 134). In particular, the coil voltage responses 141 and 142 may correspond to a relay device 100 having a non-welded contact 118 (e.g., non-welded coil voltage response 141) or an at least partially welded contact 118 (e.g., at least partially welded coil voltage response 142).

At an initial time $t_0$, the control and monitoring circuitry 18 may instruct the power source 122 to ping the relay coil 112 of the relay device 100 with a fixed current profile. In some embodiments, the fixed current profile may be stored in the memory 20 or any other suitable storage device. For example, the fixed current profile may correspond to the exemplary current profile 132 illustrated in FIG. 5 during the time period 134. However, it should be understood that any suitable fixed current profile may be used to ping the relay coil 112 in order to determine whether the relay device 100 has an at least partially welded contact or a welded contact before the armature 102 begins to move toward the relay coil 112. In some embodiments, the fixed current profile may be maintained using a control loop via an H-bridge circuit or the like. Further, the power source 122 may include a direct current (DC) voltage power source.

After the control and monitoring circuitry 18 has instructed the power source 122 to ping the relay coil 112 with the fixed current profile, the sensors 124 may measure the instantaneous voltage of the relay coil 112, and transmit the instantaneous voltage measurements associated with the relay coil 112 to the control and monitoring circuitry 18. The control and monitoring circuitry 18 may then determine the cumulative voltage integral of the relay coil 112 over time based on the received instantaneous voltage measurements associated with the relay coil 112. For example, the control and monitoring circuitry 18 may calculate a first data point 144 or 146 for a coil voltage response 141 or 142 of the relay coil 112. As no time has passed from to, it may be appreciated that the cumulative voltage integral(s) at to (i.e., data points 144 and 146) will equal zero until more time has passed.

Up to a final time $t_f$, the sensors 124 may continuously measure the instantaneous voltage of the relay coil 112. For example, a final data point 148 or 150 may be generated by the control and monitoring circuitry 18 at time $t_f$. Accordingly, the control and monitoring circuitry 18 may calculate the cumulative voltage integral up to time $t_f$, thus generating the voltage response 141 or 142 for the relay coil 112. In certain embodiments, the final time $t_f$ may correspond to the end of the period of time 134 during a turn-on sequence of the relay device 100. For example, the final time $t_f$ may be 1.5 ms after the relay coil 112 is pinged with the fixed current profile, 1.25 ms after the relay coil 112 is pinged with the fixed current profile, 1 ms after the relay coil 112 is pinged with the fixed current profile, or any other suitable time period after the relay coil 112 is pinged with the fixed current profile to determine whether the relay coil 112 has one or more welded contacts or not.

As shown in FIG. 6, the coil voltage responses 141 or 142 of the relay coil 112 may correspond to the relay device 100 having a non-welded contact 118 (e.g., non-welded coil voltage response 141) or an at least partially welded contact 118 (e.g., welded coil voltage response 142). For example, the inductance of the relay coil 112 of the relay device 100 having an at least partially welded contact 118 (e.g., as illustrated by the coil voltage response 142) is greater than the inductance of the relay coil 112 of the relay device 100 having no welded contacts (e.g., as illustrated by the coil voltage response 141). That is, by comparing voltage measurements of the relay coil 112 after pinging the relay coil 112 with the fixed current profile to the coil voltage response 141 or 142 associated with the relay coil 112, a determination may be made as to whether the relay device 100 has an at least partially welded contact 118 or no welded contacts 118. In certain embodiments, a baseline coil voltage response (e.g., coil voltage response 141 or 142) may be determined for the relay device 100 before one or more additional voltage measurements of the relay coil 112 are detected for the relay device 100 and compared to the baseline coil voltage response. If the additional voltage measurements of the relay coil 112 are similar to the coil voltage response 141, the additional voltage measurements may indicate that the relay device 100 has no welded contacts 118. Alternatively, if the additional voltage measurements of the relay coil 112 are similar to the coil voltage response 142, the additional voltage measurements may indicate that the relay device 100 has an at least partially welded contact 118.

In some embodiments, the additional voltage measurements may indicate that the relay device 100 has an at least partially welded contact 118 if the additional voltage measurements are outside a first threshold of the coil voltage response 141 or within a second threshold of the coil voltage response 142, or the additional voltage measurements may indicate that the relay device 100 has no welded contacts 118 if the additional voltage measurements are within a third threshold of the coil voltage response 141 or outside a fourth threshold of the coil voltage response 142. For example, the first threshold, the second threshold, the third threshold, the fourth threshold, or a combination thereof, may be less than or equal to five percent, less than or equal to ten percent, less than or equal to fifteen percent, less than or equal to twenty percent, or the like, of the corresponding coil voltage response 141, 142. Alternatively, the first threshold, the second threshold, the third threshold, the fourth threshold, or a combination thereof, may be greater than or equal to five percent, greater than or equal to ten percent, greater than or equal to fifteen percent, greater than or equal to twenty percent, or the like, of the corresponding coil voltage response 141, 142. In other embodiments, the additional voltage measurements may indicate that the relay device 100 has an at least partially welded contact 118 if the additional voltage measurements are greater than one or more corresponding values of the coil voltage response 141, or the additional voltage measurements may indicate the relay device 100 has no welded contacts 118 if the additional voltage measurements are less than one or more corresponding values of the coil voltage response 142.

Keeping the foregoing in mind, FIG. 7 is a flow chart of a process 160 for determining whether a contact 118 of a relay device (e.g., 100) is at least partially welded based on coil voltage measurements associated with the relay device 100 and performing a system response based upon the determination. As described above, it may be desirable to detect whether the relay device 100 has an at least partially welded contact 118 before the armature 102 of the relay device 100 begins to move toward the relay coil 112 during the turn-on sequence of the relay device 100. As such, in some embodiments, the process 160 may be performed in parallel with the turn-on sequence of the relay device 100 (i.e., before the armature 102 of the relay device 100 begins to move toward the relay coil 112 during the turn-on sequence) or at any other suitable time. It should be noted that although the process 160 will be described as being performed by the control and monitoring circuitry 18, it should be understood that the process 160 may be performed by any suitable control system or computing device (e.g., the controller 44). In addition, although the process 160 is described in a particular order, it should be noted that the process 160 may be performed in any suitable order.

At block 162, the control and monitoring circuitry 18 may instruct (e.g., send a command signal to) the power source 122 to send a pulse with a fixed current profile to the relay coil 112 of the relay device 100 at an initial time $t_0$. In certain embodiments, the magnitude of the fixed current profile associated with the pulse may be predetermined (i.e., previously stored in the memory 20 of the control and monitoring circuitry 18). For example, the fixed current profile may correspond to the exemplary current profile 132 illustrated in FIG. 5 during the time period 134 of the turn-on sequence. As mentioned above, the fixed current profile may be associated with a baseline coil voltage response 141 associated with the relay device 100 having a non-welded state (i.e., having no welded contacts) and/or a baseline coil voltage response 142 associated with the relay device 100 having an at least partially welded state (i.e., having an at least partially welded contact). That is, the baseline coil voltage responses 141, 142 associated with the relay device 100 may be determined at some time before the control and monitoring circuitry 18 instructs the power source 122 to send the pulse to the relay coil 112 at block 162.

Over a certain time period (e.g., from initial time $t_0$ to final time $t_f$), the control and monitoring circuitry 18 may receive one or more voltage measurements of the relay coil 112 from the sensors 124 at block 164. In some embodiments, the sensors 124 may generate the voltage measurements at a predetermined rate. For example, the sensors 124 may measure the voltage of the relay coil 112 (i.e., the coil voltage) at a certain rate (e.g., n samples per m milliseconds). In this way, the control and monitoring circuitry 18 may receive one or more coil voltage measurements associated with the relay device 100 over the time period.

As the control and monitoring circuitry 18 receives the coil voltage measurements from the sensors 124 at block 164, the control and monitoring circuitry 18 may optionally log the coil voltage measurements as a function of time. The control and monitoring circuitry 18 may store the coil voltage measurements in the memory 20 or any other suitable storage device. In certain embodiments, the control and monitoring circuitry 18 may receive coil voltage measurements until an appropriate condition is present (e.g., after a sufficient number of samples has been logged, $t_f$ has been reached, etc.). For example, the control and monitoring circuitry 18 may receive coil voltage measurements from the initial time $t_0$ to any time $t_f$. That is, the time period between the initial time $t_0$ and $t_f$ may be any suitable time period to receive coil voltage measurements associated with the relay device 100. In some embodiments, the time period may be less than or equal to 1.5 ms after pinging the relay coil 112 with the fixed current profile, less than or equal to 1.25 ms after pinging the relay coil 112 with the fixed current profile, or less than or equal to 1 ms after pinging the relay coil 112 with the fixed current profile.

In any case, after receiving one or more coil voltage measurements from the sensors 124 at block 164, the control and monitoring circuitry 18 may determine whether the coil voltage measurements indicate that the relay device 100 includes an at least partially welded contact 118 at block 166. In some embodiments, one or more baseline coil voltage responses associated with the relay device 100 or a type associated with the relay device 100 (e.g., Form A, Form B, Form C, single-pole, single-throw, double-break, or the like) may be determined during a time period before implementation of the process 160 by the control and monitoring circuitry 18. For instance, the control and monitoring circuitry 18 may determine a baseline coil voltage response of the relay coil 112 that corresponds to the relay device 100 having no welded contacts. The control and monitoring circuitry 18 may receive one or more coil voltage measurements of the relay coil 112 and determine the baseline coil voltage response of the relay coil 112. The baseline coil voltage response of the relay coil 112 may then be stored in a memory 20 accessible by the control and monitoring circuitry 18.

Additionally, or alternatively, the control and monitoring circuitry 18 may retrieve a representation of one or more baseline coil voltage responses associated with the relay device 100 or a type of the relay device 100 from the memory 20. For instance, the memory 20 may store respective representations of a first baseline coil voltage response that corresponds to the relay device 100 or respective types of various relay devices having no welded contacts 118, respective representations of a second baseline coil voltage response that corresponds to the relay device 100 or respective types of various relay devices having an at least partially welded contact 118. The control and monitoring circuitry 18 may retrieve one or more baseline coil voltage responses from the memory 20 that corresponds to the relay device 100 or the type of the relay device (e.g., a Form A relay device, a Form B relay device, a Form C relay device, a single-pole, single-throw double-break relay device, or the like). For example, the control and monitoring circuitry 18 may retrieve the first baseline coil voltage response that corresponds to the relay device 100 having no welded contacts 118, the second baseline coil voltage response that corresponds to the relay device 100 having an at least partially welded contact 118, or both.

In any case, the control and monitoring circuitry 18 may compare one or more of the coil voltage measurements received at block 164 to a baseline coil voltage response associated with the relay device 100 having no welded contacts 118, a baseline coil voltage response associated with the relay device 100 having an at least partially welded contact 118, or both. As mentioned above, if the coil voltage measurements differ from the baseline coil voltage response associated with the relay device 100 having no welded contacts 118, the control and monitoring circuitry 18 may determine that the coil voltage measurements are indicative of an at least partially welded contact 118 in the relay device 100. Alternatively, if the coil voltage measurements differ from the baseline voltage response associated with the relay device 100 having an at least partially welded contact 118, the control and monitoring circuitry 18 may determine that the coil current measurements are indicative of no welded contacts 118 in the relay device 100. For example, the control and monitoring circuitry 18 may determine that the relay device 100 has an at least partially welded contact 118 if the coil voltage measurements are outside of a threshold associated with the baseline coil voltage response that corresponds to the relay device 100 having no welded contacts 118 if the coil voltage measurements are within a threshold associated with the baseline coil voltage response that corresponds to the relay device 100 having an at least partially welded contact 118. In another example, the control and monitoring circuitry 18 may determine that the relay device 100 has no welded contacts 118 if the coil voltage measurements are outside of a threshold associated with the baseline coil voltage response that corresponds to the relay device 100 having an at least partially welded contact 118 or if the coil voltage measurements are within a threshold associated with the baseline coil voltage response that corresponds to the relay device 100 having no welded contacts 118. Alternatively, the control and monitoring circuitry 18 may determine that the relay device 100 has an at least partially welded contact 118 if the coil voltage measurements are greater than corresponding values of the baseline coil voltage response that corresponds to the relay device 100 having no welded contacts 118, or the control and monitoring circuitry 18 may determine that the relay device 100 has no welded contacts 118 if the coil voltage measurements are less than corresponding values of the baseline coil voltage response that corresponds to the relay device 100 having an at least partially welded contact 118.

If the control and monitoring circuitry 18 determines that the coil voltage measurements associated with the relay device 100 indicate that the relay device 100 does not include an at least partially welded contact at block 166, the control and monitoring circuitry 18 may perform a system response that corresponds to the relay device 100 not including an at least partially welded contacts (i.e., the relay device 100 having a non-welded state) at block 168. In some embodiments, the system response for a non-welded state associated with the relay device 100 may allow the relay device 100 to continue operating normally. For instance, if a turn-on sequence associated with the relay device 100 was being performed, the turn-on sequence may continue such that the armature 102 of the relay device 100 is attracted to the relay coil 112 to close the relay device 100 and connect electric power to a load.

On the other hand, if the control and monitoring circuitry 18 determines that the coil voltage measurements associated with the relay device 100 indicate that the relay device 100 includes an at least partially welded contact at block 166, the control and monitoring circuitry 18 may perform a system response that corresponds to the relay device 100 including the at least partially welded contact (i.e., the relay device 100 having a welded state) at block 170. In some embodiments, the system response for a welded state associated with the relay device 100 may direct the control and monitoring circuitry 18 to transmit a command to the relay device 100 or the power source 12 to shut down the relay device 100. For instance, if a turn-on sequence associated with the relay device 100 was being performed, the turn-on sequence may be shut down before the armature 102 of the relay device 100 moves toward the relay coil 112. In some embodiments, the control and monitoring circuitry 18 may transmit a command to display a failure notification, such as via a light emitting diode (LED), a graphical user interface (GUI), or the like. Additionally, or alternatively, the control and monitoring circuitry 18 may transmit a notification of the welded state associated with the relay device 100 to one or more computing devices via a network 21.

As discussed above, to determine whether the contacts 114 and 116 or the contacts 118 and 120 are at least partially welded together, the relay coil 112 of the relay device may be pinged with a non-intrusive current pulse (i.e., instead of the non-intrusive voltage pulse as discussed above with respect to FIGS. 6 and 7). For example, the control and monitoring circuitry 18 may determine whether a contact of a relay device 100 (e.g., 100) is at least partially welded based on coil current measurements associated with the relay device 100 and perform a system response based upon the determination. As described above, it may be desirable to detect whether the relay device 100 has an at least partially welded contact before the armature 102 of the relay device 100 begins to move toward the relay coil 112 during the turn-on sequence of the relay device 100. As such, in some embodiments, the control and monitoring circuitry 18 may determine whether a contact of the relay device 100 is at least partially weleded and perform a system response based upon the determination in parallel with the turn-on sequence of the relay device 100 (i.e., before the armature 102 of the relay device 100 begins to move toward the relay coil 112 during the turn-on sequence) or at any other suitable time. Although certain techniques as described herein are performed by the control and monitoring circuitry 18, it should be understood that the such techniques may be performed by any suitable control system or computing device (e.g., the controller 44).

The control and monitoring circuitry 18 may instruct (e.g., send a command signal to) the power source 122 to send a pulse with a fixed voltage profile to the relay coil 112 of the relay device 100 at an initial time $t_0$. In certain embodiments, the magnitude of the fixed voltage profile associated with the pulse may be predetermined (i.e., previously stored in the memory 20 of the control and monitoring circuitry 18). For example, the fixed voltage profile may correspond to a step load. As mentioned above, the fixed voltage profile may be associated with a baseline coil current response associated with the relay device 100 having a non-welded state (i.e., having no welded contacts), a baseline coil current profile response associated with the relay device 100 having a welded state (i.e., having an at least partially welded contact), or both. That is, the baseline coil current responses associated with the relay device 100 may be determined at some time before the control and monitoring circuitry 18 instructs the power source 122 to send the pulse to the relay coil 112.

The control and monitoring circuitry 18 may then receive one or more current voltage measurements of the relay coil 112 from the sensors 124 during a period of time (e.g., from initial time $t_{01}$ to final time $t_f$). In some embodiments, the sensors 124 may generate the current measurements at a predetermined rate. For example, the sensors 124 may measure the current of the relay coil 112 (i.e., the coil current) at a certain rate (e.g., n samples per m milliseconds). In this way, the control and monitoring circuitry 18 may receive one or more coil voltage measurements associated with the relay device 100 over the time period. In some embodiments, the time period may be less than or equal to 1.5 ms after pinging the relay coil 112 with the fixed current profile, less than or equal to 1.25 ms after pinging the relay coil 112 with the fixed current profile, or less than or equal to 1 ms after pinging the relay coil 112 with the fixed current profile.

As the control and monitoring circuitry 18 receives the coil current measurements form the sensors 124, the control and monitoring circuitry 18 may optionally log the coil current measurements as a function of time. The control and monitoring circuitry 18 may store the coil current measurements in the memory 20 or any other suitable storage device. In certain embodiments, the control and monitoring circuitry 18 may receive coil current measurements until an appropriate condition is present (e.g., after a sufficient number of samples has been logged, to has been reached, etc.).

After receiving one or more coil current measurements from the sensors 124, the control and monitoring circuitry 18 may determine whether the coil current measurements associated with the relay device 100 indicate that the relay device 100 includes an at least partially welded contact 118. As mentioned above, one or more baseline coil current responses associated with the relay device 100 or a type associated with the relay device 100 (e.g., Form A, Form B, Form C, single-pole, single-throw, double-break, or the like) may be previously determined during a time period by the control and monitoring circuitry 18. For instance, the control and monitoring circuitry 18 may determine a baseline coil current response of the relay coil 112 that corresponds to the relay device 100 having no welded contacts 118. The control and monitoring circuitry 18 may receive one or more coil current measurements of the relay coil 112 and determine the baseline coil current response of the relay coil 112. The baseline coil current response of the relay coil 112 may then be stored in a memory 20 accessible by the control and monitoring circuitry 18.

Additionally, or alternatively, the control and monitoring circuitry 18 may retrieve a representation of one or more baseline coil voltage responses associated with the relay device 100 or a type of the relay device 100 from the memory 20. For instance, the memory 20 may store respective representations of a first baseline coil current response that corresponds to the relay device 100 or respective types of various relay devices having no welded contacts, respective representations of a second baseline coil current response that corresponds to the relay device 100 or respective types of various relay devices having an at least partially welded contact 118. The control and monitoring circuitry 18 may retrieve one or more baseline coil current responses from the memory 20 that corresponds to the relay device 100 or the type of the relay device (e.g., a Form A relay device, a Form B relay device, a Form C relay device, a single-pole, single-throw double-break relay device, or the like). For example, the control and monitoring circuitry 18 may retrieve the first baseline coil current response that corresponds to the relay device 100 having no welded contacts 118, the second baseline coil current response that corresponds to the relay device 100 having an at least partially welded contact 118, or both.

In any case, the control and monitoring circuitry 18 may compare one or more of the received coil current measurements to a baseline coil current response associated with the relay device 100 having no welded contacts 118, a baseline coil current response associated with the relay device 100 having an at least partially welded contact 118, or both. As mentioned above, if the coil current measurements differ from the baseline coil current response associated with the relay device 100 having no welded contacts 118, the control and monitoring circuitry 18 may determine that the coil current measurements are indicative of an at least partially welded contact 118 in the relay device 100. Alternatively, if the coil current measurements differ from the baseline coil current response associated with the relay device 100 having an at least partially welded contact 118, the control and monitoring circuitry 18 may determine that the coil current measurements are indicative of no welded contacts 118 in the relay device 100. For example, the control and monitoring circuitry 18 may determine that the relay device 100 has an at least partially welded contact 118 if the coil current measurements are outside of a threshold associated with the baseline coil current response that corresponds to the relay device 100 having no welded contacts 118 if the coil current measurements are within a threshold associated with the baseline coil current response that corresponds to the relay device 100 having an at least partially welded contact 118. In another example, the control and monitoring circuitry 18 may determine that the relay device 100 has no welded contacts 118 if the coil current measurements are outside of a threshold associated with the baseline coil current response that corresponds to the relay device 100 having an at least partially welded contact 118 or if the coil current measurements are within a threshold associated with the baseline current response that corresponds to the relay device 100 having no welded contacts 118. Alternatively, the control and monitoring circuitry 18 may determine that the relay device 100 has an at least partially welded contact 118 if the coil current measurements are greater than corresponding values of the baseline coil current response that corresponds to the relay device 100 having no welded contacts 118, or the control and monitoring circuitry 18 may determine that the relay device 100 has no welded contacts 118 if the coil current measurements are less than corresponding values of the baseline coil current response that corresponds to the relay device 100 having an at least partially welded contact 118.

If the control and monitoring circuitry 18 determines that the coil current measurements associated with the relay device 100 indicate that the relay device 100 does not include an at least partially welded contacts, the control and monitoring circuitry 18 may perform a system response that corresponds to the relay device 100 not including an at least partially welded contact (i.e., the relay device 100 having a non-welded state). In some embodiments, the system response for a non-welded state associated with the relay device 100 may allow the relay device 100 to continue operating normally. For instance, if a turn-on sequence associated with the relay device 100 was being performed, the turn-on sequence may continue such that the armature 102 of the relay device 100 is attracted to the relay coil 112 to close the relay device 100 and connect electric power to a load. In some embodiments, the control and monitoring circuitry 18 may log the non-welded state associated with the relay device 100 in the memory 20 or any other suitable storage device.

On the other hand, if the control and monitoring circuitry 18 determines that the coil current measurements associated with the relay device 100 indicate that the relay device 100 includes an at least partially welded contact, the control and monitoring circuitry 18 may perform a system response that corresponds to the relay device 100 including an at least partially welded contact (i.e., the relay device 100 having a welded state). In some embodiments, the system response for a welded state associated with the relay device 100 may direct the control and monitoring circuitry 18 to transmit a command to the relay device 100 or the power source 12 to shut down the relay device 100. For instance, if a turn-on sequence associated with the relay device 100 was being performed, the turn-on sequence may be shut down before the armature 102 of the relay device 100 moves toward the relay coil 112. In some embodiments, the control and monitoring circuitry 18 may transmit a command to display a failure notification, such as via a light emitting diode (LED), a graphical user interface (GUI), or the like. Additionally, or alternatively, the control and monitoring circuitry 18 may transmit a notification of the welded state associated with the relay device 100 to one or more computing devices via a network 21. In some embodiments, the control and monitoring circuitry 18 may log the welded event in the memory 20 or any other suitable storage device.

In certain embodiments, after the control and monitoring circuitry 18 determines that a system response for a non-welded state associated with the relay device 100 will be performed or a system response for a welded state associated with the relay device 100 will be performed, the control and monitoring circuitry 18 may optionally instruct the power source 122 to transmit a pulse with a reverse voltage profile to the relay coil 112. For example, the pulse with the reverse voltage profile may be equal in magnitude to the fixed voltage profile that was transmitted to the relay coil 112. Additionally, the control and monitoring circuitry 18 may instruct the power source 122 to transmit the pulse with the reverse voltage profile for a period of time substantially equal to the time period associated with the fixed voltage profile. For example, if the relay coil was pinged with the pulse associated with the fixed voltage profile for a time period of $t_{01}$ to $t_{f1}$, the relay coil 112 may be pinged with the pulse associated with the reverse voltage profile for a time period of $t_{02}$ to $t_{f2}$ that may be substantially similar in duration as the time period of $t_{01}$ to $t_{f1}$.

As described above, the control and monitoring circuitry 18 may receive a baseline coil voltage response associated with the relay device 100 having no welded contacts 118 or a baseline coil current response associated with the relay device 100 having no welded contacts 118. The control and monitoring circuitry 18 may then determine that the relay device 100 has an at least partially welded contact 118 or no welded contacts 118 if one or more voltage measurements or one or more current measurements associated with the relay coil 112 are within a threshold associated with the baseline coil voltage response or a threshold associated with the baseline coil current response, respectively. Under certain conditions, however, the ambient temperature of the relay coil 112 may affect the coil resistance of the relay coil 112, thereby influencing voltage measurements or current measurements of the relay coil 112. Thus, the control and monitoring circuitry 18 may compensate for changes in the ambient temperature of the relay coil 112 during implementation of the techniques described herein, In certain embodiments, before the control and monitoring circuitry 18 transmits a command to the power source 122 to send a pulse with a fixed voltage profile or fixed current profile to the relay coil 112, the control and monitoring circuitry 18 may measure the coil resistance of the relay coil 112 before power is provided to the relay coil 112. For example, control and monitoring circuitry 18 may receive an ambient temperature associated with the relay coil 112 from one or more sensors (e.g., sensors 124). Based on the ambient temperature measurement, the control and monitoring circuitry 18 may determine a coil resistance of the relay coil 112 based on a first linear relationship between the ambient temperature and the initial coil resistance of the relay coil 112. Thereafter, the control and monitoring circuitry 18 may adjust the thresholds associated with the baseline coil voltage response and/or the baseline coil current response based on a second linear relationship between the thresholds and the coil resistance. For example, the control and monitoring circuitry may increase or decrease the thresholds based on the coil resistance of the relay coil 112. In this way, the control and monitoring circuitry 18 may compensate for fluctuations in the ambient temperature surrounding the relay coil 112.

In other embodiments, the control and monitoring circuitry 18 may receive an ambient temperature associated with the relay coil 112 from one or more sensors (e.g., sensors 124) before or in parallel with the control and monitoring circuitry 18 transmitting the command to the power source 122 to send the pulse with the fixed voltage profile or the fixed current profile to the relay coil 112. In such embodiments, the control and monitoring circuitry 18 may directly adjust the thresholds associated with the baseline coil voltage response and/or the baseline coil current response before determining whether the voltage measurements or the current measurements of the relay coil 112 are indicative of an at least partially welded contact.

Technical effects of the embodiments described herein include detecting welded contacts in a non-intrusive manner. That is, welded contacts may be detected without signals or sensors crossing the isolation barrier between the relay coil 112 and the contacts 114 and 116 or the contacts 118 and 120. Moreover, the embodiments disclosed herein allow for detecting welded contacts without turning on the relay device (i.e., without applying power to the system 10). As a result, electrical and mechanical safety issues associated with welded contacts within relay devices may be reduced in a non-intrusive manner, thereby improving relay device performance without adding a significant amount of complexity to the system 10 and the relay device 100.

It should be noted that some switching or relay devices may include more than one coil. For example, some relay devices may have two coils, such that both coils may be used to control the movement of an armature. In these types of relay devices, one of the coils may be used to hold the armature in place after it moves to a particular position.

It should also be noted that although certain embodiments described herein are described in the context or contacts that are part of a relay device, it should be understood that the embodiments described herein may also be implemented in suitable contactors and other switching components. It should also be noted that while some embodiments described herein are detailed with reference to a particular relay device or contactor described in the specification, it should be understood that these descriptions are provided for the benefit of understanding how certain techniques are implemented. Indeed, the systems and methods described herein are not limited to the specific devices employed in the descriptions above.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
- a first power source; and
- a switching device, comprising:
  - an armature configured to electrically couple one or more movable contacts to one or more contacts of an electric circuit;
  - a relay coil configured to receive a current from a second power source, thereby causing the armature to electrically couple the one or more movable contacts to the one or more contacts of the electric circuit or electrically disconnect the one or more movable contacts from the one or more contacts after a period of time; and
- a control system configured to perform operations comprising:
  - transmitting a command to the second power source to provide power to the relay coil with a fixed current profile;
  - receiving one or more voltage measurements associated with the relay coil during the period of time;
  - determining that the one or more voltage measurements indicate that the one or more movable contacts are at least partially welded to the one or more contacts of the electric circuit; and
  - in response to determining that the one or more voltage measurements indicate that the one or more movable contacts are at least partially welded to the one or more contacts of the electric circuit, transmitting an additional command to the second power source to disconnect the current to the relay coil.

2. The system of claim 1, wherein the command to the second power source to provide power to the relay coil is transmitted during a turn-on sequence of the switching device.

3. The system of claim 1, wherein determining that the one or more voltage measurements indicate that the one or more movable contacts is at least partially welded to the one or more contacts of the electric circuit comprises:
- receiving one or more baseline voltage responses associated with the relay coil; and
- determining that the one or more voltage measurements differ from respective values of the one or more baseline voltage responses.

4. The system of claim 3, wherein the one or more baseline voltage responses are associated with a non-welded state of the switching device.

5. The system of claim 4, wherein determining that the one or more voltage measurements differ from respective values of the one or more baseline voltage responses comprises determining that the one or more voltage measurements are greater than the respective values of the one or more baseline voltage responses.

6. The system of claim 3, wherein the one or more baseline voltage responses are associated with a welded state of the switching device.

7. The system of claim 6, wherein determining that the one or more voltage measurements differ from respective values of the one or more baseline voltage responses comprises determining that the one or more voltage measurements are within a threshold of the one or more baseline voltage responses.

8. The system of claim 1, wherein the additional command to disconnect the current to the relay coil is transmitted to the second power source before the armature electrically couples the one or more movable contacts to the one or more contacts of the electric circuit or electrically disconnects the one or more movable contacts from the one or more contacts.

9. A method, comprising:
- transmitting, by a control system to a first power source associated with a switching device, a command to provide power to a relay coil of the switching device with a fixed current profile;
- receiving, by the control system, one or more voltage measurements associated with the relay coil during a period of time;
- determining, by the control system, that one or more voltage measurements indicate that one or more movable contacts of the switching device are at least partially welded to one or more contacts of an electric circuit; and in response to determining that the one or more voltage measurements indicate that the one or more movable contacts of the switching device are at least partially welded to the one or more moveable contacts of the electric circuit, transmitting, by the control system, an additional command to a second power source to disconnect a current to the relay coil.

10. The method of claim 9, wherein determining that the one or more voltage measurements indicate that the one or more movable contacts are at least partially welded to the one or more contacts of the electric circuit comprises:

receiving one or more baseline voltage responses associated with the relay coil; and determining that the one or more voltage measurements differ from respective values of the one or more baseline voltage responses.

11. The method of claim 10, wherein the one or more baseline voltage responses are associated with a welded state of the switching device.

12. The method of claim 11, wherein determining that the one or more voltage measurements differ from respective values of the one or more baseline voltage responses comprises determining that the one or more voltage measurements are within a threshold of the one or more baseline voltage responses.

13. The method of claim 12, comprising adjusting, by the control system, the threshold of the one or more baseline voltage responses based on an ambient temperature associated with the relay coil.

14. The method of claim 13, comprising receiving, by the control system, a measurement of the ambient temperature associated with the relay coil before transmitting the command to the first power source to provide power to the relay coil of the switching device with the fixed current profile.

15. The method of claim 10, comprising:

determining, by the control system, a coil resistance of the relay coil based on one or more additional voltage measurements associated with the relay coil and one or more current measurements associated with the relay coil; and adjusting, by the control system, a threshold of the one or more baseline voltage responses based on the coil resistance.

16. The method of claim 9, comprising transmitting a notification indicative of a welded state of the switching device to one or more computing devices.

17. A non-transitory, computer-readable medium storing instructions executable by at least one processor in a computing device, wherein the instructions comprise instructions to cause the at least one processor to perform operations comprising:

transmitting, to a first power source associated with a switching device, a command to provide power to a relay coil of the switching device with a fixed current profile;

receiving one or more voltage measurements associated with the relay coil during a period of time;

determining whether the one or more voltage measurements associated with the relay coil indicate that one or more movable contacts of the switching device are at least partially welded to one or more contacts of an electric circuit; and in response to determining that the one or more voltage measurements associated with the relay coil indicate that the one or more movable contacts of the switching device are at least partially welded to the one or more contacts of the electric circuit, transmitting an additional command to a second power source to disconnect a current to the relay coil.

18. The non-transitory, computer-readable medium of claim 17, wherein the command to provide the power to the relay coil is transmitted during a turn-on sequence of the switching device.

19. The non-transitory, computer-readable medium of claim 17, wherein the additional command to disconnect the current to the relay coil is transmitted to the second power source before an armature of the switching device electrically couples the one or more movable contacts to the one or more contacts of the electric circuit or electrically disconnects the one or more movable contacts from the one or more contacts of the electric circuit.

20. The non-transitory, computer-readable medium of claim 17, wherein the switching device is configured to continue an operation during a turn-on sequence in response to determining that the one or more voltage measurements associated with the relay coil indicate that the one or more movable contacts of the switching device are not welded to the one or more contacts of the electric circuit.

* * * * *